US008153724B2

(12) United States Patent
Maton et al.

(10) Patent No.: US 8,153,724 B2
(45) Date of Patent: Apr. 10, 2012

(54) ORGANOSILOXANE COMPOSITIONS

(75) Inventors: Isabelle Maton, Braine L'alleud (BE);
Giuseppina Lavinaro, Trivieres (BE);
Thierry Dessilly, Blaugies (BE);
Tommy Detemmerman,
Wezembeek-Oppem (BE)

(73) Assignee: Dow Corning Corporation, Midland, MI (US)

( * ) Notice: Subject to any disclaimer, the term of this patent is extended or adjusted under 35 U.S.C. 154(b) by 676 days.

(21) Appl. No.: 11/910,746

(22) PCT Filed: Apr. 3, 2006

(86) PCT No.: PCT/EP2006/061285
§ 371 (c)(1),
(2), (4) Date: Oct. 13, 2008

(87) PCT Pub. No.: WO2006/106095
PCT Pub. Date: Oct. 12, 2006

(65) Prior Publication Data
US 2009/0234052 A1    Sep. 17, 2009

(30) Foreign Application Priority Data

Apr. 6, 2005 (GB) .................................. 0506939.8
Aug. 6, 2005 (GB) .................................. 0516239.1

(51) Int. Cl.
*C08L 83/04* (2006.01)
(52) U.S. Cl. ........ 524/588; 524/140; 524/284; 524/306; 524/313; 524/314; 524/322; 524/386; 524/423; 524/424; 524/430; 524/448; 524/481; 528/17; 528/18
(58) Field of Classification Search .................. None
See application file for complete search history.

(56) References Cited

U.S. PATENT DOCUMENTS

| | | |
|---|---|---|
| 3,220,879 A | 11/1965 | Stare et al. |
| 3,308,203 A | 3/1967 | Metevia et al. |
| 3,341,486 A | 9/1967 | Murphy |
| 3,378,520 A | 4/1968 | Sattlegger et al. |
| 3,419,593 A | 12/1968 | Willing |
| 3,427,270 A | 2/1969 | Northrup |
| 3,433,765 A | 3/1969 | Geipel |
| 3,480,583 A | 11/1969 | Bailey et al. |
| 3,715,334 A | 2/1973 | Karstedt |
| 3,814,730 A | 6/1974 | Karstedt |
| 3,817,894 A | 6/1974 | Butler et al. |
| 3,839,388 A | 10/1974 | Nitzsche et al. |
| 3,923,705 A | 12/1975 | Smith |
| 3,957,842 A | 5/1976 | Prokai et al. |
| 3,962,160 A | 6/1976 | Beers et al. |
| 3,971,751 A | 7/1976 | Isayama et al. |
| 4,020,044 A | 4/1977 | Crossan et al. |
| 4,022,941 A | 5/1977 | Prokai et al. |
| 4,071,498 A | 1/1978 | Frye et al. |
| 4,147,855 A | 4/1979 | Schiller et al. |
| 4,240,450 A | 12/1980 | Grollier et al. |
| 4,247,445 A | 1/1981 | Smith, Jr. et al. |
| 4,312,801 A | 1/1982 | Hiriart Bodin et al. |
| 4,357,438 A | 11/1982 | Sattlegger et al. |
| 4,358,558 A | 11/1982 | Shimizu |
| 4,433,096 A | 2/1984 | Bokerman et al. |
| 4,472,563 A | 9/1984 | Chandra et al. |
| 4,486,567 A | 12/1984 | Bowman et al. |
| 4,515,834 A | 5/1985 | Fukayama et al. |
| 4,564,693 A | 1/1986 | Riederer |
| 4,568,701 A | 2/1986 | Hopkins, Jr. |
| 4,568,707 A | 2/1986 | Voigt et al. |
| 4,599,438 A | 7/1986 | White et al. |
| 4,614,760 A | 9/1986 | Homan et al. |
| 4,655,767 A | 4/1987 | Woodard et al. |
| 4,701,490 A | 10/1987 | Burkhardt et al. |
| 4,824,891 A | 4/1989 | Laurent et al. |
| 4,902,499 A | 2/1990 | Bolish, Jr. et al. |
| 4,902,575 A | 2/1990 | Yukimoto et al. |
| 4,906,707 A | 3/1990 | Yukimoto et al. |
| 4,918,121 A | 4/1990 | Peccoux et al. |
| 4,965,311 A | 10/1990 | Hirose et al. |
| 4,968,766 A | 11/1990 | Kendziorski |
| 4,985,476 A | 1/1991 | Endres et al. |
| 4,990,555 A | 2/1991 | Trego |
| 5,000,029 A | 3/1991 | Laurent et al. |
| 5,043,012 A | 8/1991 | Shinohara et al. |

(Continued)

FOREIGN PATENT DOCUMENTS

CN             1346384        4/2002
(Continued)

OTHER PUBLICATIONS

English language abstract for DE 3217516 extracted from espacenet.com database dated Jul. 15, 2008.
English language abstract for DE 3342026 extracted from espacenet.com database dated Jul. 15, 2008.
English language abstract for DE 3342027 extracted from espacenet.com database dated Jul. 15, 2008.
English language abstract for EP 0043501 extracted from delphion.com database dated Jul. 22, 2008.
English language abstract for EP 0093918 extracted from espacenet.com database dated Jul. 18, 2008.
English language abstract for EP 0215470 extracted from delphion.com database dated Jul. 22, 2008.
English language abstract for EP 0801101 extracted from espacenet.com database dated Jul. 15, 2008.

(Continued)

*Primary Examiner* — Marc Zimmer
(74) *Attorney, Agent, or Firm* — Howard & Howard Attorneys PLLC

(57) ABSTRACT

A moisture curable composition is capable of cure to an elastomeric body. The composition includes an extended polymer, a suitable cross-linking agent, a suitable condensation catalyst, an organic plasticizer, and one or more fillers. The extended polymer includes an organosiloxane containing polymer of a specific formula and an organic extender selected from linear or branched mono unsaturated hydrocarbons, wherein the organopolysiloxane polymer comprises from 5 to 20% by weight of the composition. The cross-linking agent includes at least two hydroxyl and/or hydrolysable groups reactive with the organopolysiloxane polymer. The organic plasticizer is selected from one or more of the group of natural drying oils, fatty acid(s), fatty acid esters, polyols, and organic phosphates.

21 Claims, No Drawings

U.S. PATENT DOCUMENTS

| | | | |
|---|---|---|---|
| 5,063,270 | A | 11/1991 | Yukimoto et al. |
| 5,175,325 | A | 12/1992 | Brown et al. |
| 5,210,129 | A | 5/1993 | de la Croi Habimana et al. |
| 5,286,787 | A | 2/1994 | Podola et al. |
| 5,300,612 | A | 4/1994 | Saruyama |
| 5,350,824 | A | 9/1994 | Kobayashi |
| 5,534,588 | A | 7/1996 | Knepper et al. |
| 5,569,750 | A | 10/1996 | Knepper et al. |
| 5,811,483 | A * | 9/1998 | Close .......................... 524/500 |
| 5,863,976 | A | 1/1999 | Schneider |
| 5,914,382 | A | 6/1999 | Friebe et al. |
| 5,973,060 | A | 10/1999 | Ozaki et al. |
| 5,981,680 | A | 11/1999 | Petroff et al. |
| 6,451,440 | B2 | 9/2002 | Atwood et al. |
| 6,545,104 | B1 | 4/2003 | Mueller et al. |
| 6,599,633 | B1 | 7/2003 | Wolf et al. |
| 6,833,407 | B1 | 12/2004 | Ahmed et al. |
| 7,094,858 | B2 * | 8/2006 | Sixt et al. ......................... 528/18 |
| 7,205,050 | B2 * | 4/2007 | Haas ............................. 428/447 |
| 7,605,203 | B2 * | 10/2009 | Feng et al. .................... 524/268 |
| 7,754,800 | B2 | 7/2010 | Maton et al. |
| 2003/0105260 | A1 | 6/2003 | Cook et al. |
| 2004/0122199 | A1 | 6/2004 | Scheim et al. |
| 2005/0054765 | A1 | 3/2005 | Putzer |
| 2008/0312365 | A1 | 12/2008 | Maton et al. |
| 2008/0312366 | A1 | 12/2008 | Maton et al. |
| 2008/0312367 | A1 | 12/2008 | Maton et al. |
| 2009/0215944 | A1 | 8/2009 | Maton et al. |
| 2009/0234052 | A1 | 9/2009 | Maton et al. |

FOREIGN PATENT DOCUMENTS

| | | |
|---|---|---|
| DE | 2364856 A1 | 7/1975 |
| DE | 2653499 A1 | 6/1978 |
| DE | 2802170 A1 | 7/1979 |
| DE | 3217516 A1 | 11/1983 |
| DE | 3342027 C1 | 5/1985 |
| DE | 3342026 A1 | 7/1985 |
| EP | 0043501 A1 | 1/1982 |
| EP | 0093918 A1 | 11/1983 |
| EP | 0154922 A2 | 9/1985 |
| EP | 0196565 A1 | 10/1986 |
| EP | 0215470 A2 | 3/1987 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0807667 A2 | 11/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 0982346 A1 | 3/2000 |
| EP | 1008598 A2 | 6/2000 |
| EP | 1041119 A2 | 10/2000 |
| EP | 1138715 A1 | 10/2001 |
| EP | 1252252 A2 | 10/2002 |
| EP | 1368426 A2 | 12/2003 |
| EP | 1254192 B1 | 8/2004 |
| EP | 1481038 A2 | 12/2004 |
| GB | 895091 | 5/1962 |
| GB | 918823 | 2/1963 |
| GB | 1289526 | 9/1972 |
| GB | 1490240 | 12/1974 |
| GB | 1490240 | 10/1977 |
| GB | 2012789 A | 8/1979 |
| GB | 2041955 A | 9/1980 |
| GB | 2252975 A | 8/1992 |
| JP | 57-042762 A | 3/1982 |
| JP | 59100136 A | 6/1984 |
| JP | 59176326 A | 10/1984 |
| JP | 63083167 A | 4/1988 |
| JP | 01152131 | 6/1989 |
| JP | 01152156 | 6/1989 |
| JP | 05178996 | 7/1993 |
| JP | 06016813 | 1/1994 |
| JP | 9506667 | 6/1997 |
| JP | 20000026726 | 1/2000 |
| JP | 2000103857 A | 4/2000 |
| JP | 20003252996 A | 9/2003 |
| WO | WO 9532245 A1 | 11/1995 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | 0061672 | 10/2000 |
| WO | WO 01/53425 A2 | 7/2001 |
| WO | WO0153425 A2 | 7/2001 |
| WO | WO 01/79330 A1 | 10/2001 |
| WO | WO 02/062893 A2 | 8/2002 |
| WO | WO02062893 A2 | 8/2002 |
| WO | WO 03/006530 A1 | 1/2003 |
| WO | WO 03/074634 A2 | 9/2003 |
| WO | WO03074634 A2 | 9/2003 |
| WO | WO 2005/103117 A1 | 11/2005 |

OTHER PUBLICATIONS

English language abstract for EP 0807667 extracted from espacenet.com database dated Jul. 15, 2008.

English language abstract for EP 0885921 extracted from espacenet.com database dated Jul. 18, 2008.

PCT International Search Report for PCT/GB2006/050075, Jul. 28, 2006, 4 pages.

PCT International Search Report for PCT/GB2006/050074, Aug. 2, 2006, 4 pages.

PCT International Search Report for PCT/GB2006/050072, Jul. 21, 2006, 4 pages.

PCT International Search Report for PCT/GB2006/050073, Aug. 2, 2006, 5 pages.

PCT International Search Report for PCT/US2006/011986, Aug. 2, 2006, 3 pages.

A.W. Karlin, et al., Uber Syntheseverfahren von Siloxanelastomeren, 5 pages.

Article: Kirk-Othmer, "Silicone Compounds", Encyclopedia of Chemical Technology, 4th edition, vol. #22, 1997, pp. 107-109.

Aart Molenberg, et al., A Fast Catalyst System for the Ring-Opening Polymerization of Cyclosiloxanes, Macromol, Rapid Commun. 16, 449-453 (1995), 5 pages.

Reinhard Schwesinger, Extremely Strong, Uncharged Auxiliary Bases; Monomeric and Polymer-Supported Polyaminophosphazenes (P2-P5), 1996, 27 pages.

Mark E. Van Dyke, et al., Reaction Kinetics for the Anionic Ring-Opening Polymerization of Tetraphenyletramethylcyclo-Tetrasiloxane Using a Fast Catalyst System, 2 pages.

English language abstract for CN 1346384 extracted from espacenet.com database, dated Jul. 16, 2010, 23 pages.

Dictionary of Chemistry and Chemical Technology, 2 pages (title page and p. 1250); Author: Hua xue hua gong da ci dian bian wei hui.; Hua xue gong ye chu ban she. Ci shu bian ji bu Publisher: Hua xue gong ye chu ban she, 2003 ISBN: 7502526110 9787502526115.

English language abstract for JP01152131 extracted from the PAJ database Jun. 13, 2011, 7 pages.

English language abstract for JP01152156 extracted from the PAJ database Jun. 13, 2011, 2 pages.

English language translation and abstract for JP05178996 extracted from the PAJ database Jun. 13, 2011, 17 pages.

English language translation and abstract for JP06016813 extracted from the PAJ database Jun. 23, 2011, 23 pages.

English language translation and abstract for JP2000026726 extracted from the PAJ database Jun. 13, 2011, 28 pages.

English language translation and abstract for JP2000103857 extracted from the PAJ database Jun. 13, 2011, 23 pages.

English language translation and abstract for JP2003252996 extracted from the PAJ database Jun. 13, 2011, 14 pages.

English language translation and abstract for JP5178996 extracted from the PAJ database Jun. 13, 2011, 17 pages.

English language abstract for JP63083167 extracted from espacenet.com database Jun. 23, 2011, 12 pages.
International Search Report for Application No. PCT/EP2006/061285 dated Jul. 28, 2006, 4 pages.

English language abstract and translation for JP 57-042762, Toshiba Silicone Co., Ltd., 23 pages.

* cited by examiner

ORGANOSILOXANE COMPOSITIONS

RELATED APPLICATIONS

This application claims priority to and all the advantages of International Patent Application No. PCT/EP2006/061285, filed on Apr. 3, 2006, which claims priority to Great Britain Patent Application Nos. GB 0506939.8 and GB 0516239.1, filed on Apr. 6, 2005 and Aug. 6, 2005 respectively.

This invention relates to a room temperature vulcanisable (RTV) silicone elastomeric composition which is paintable with solvent based paints, and a method for producing a painted surface on a silicone elastomer obtained from said silicone elastomeric composition.

Organopolysiloxane compositions which cure to produce elastomers at room temperature are widely used as sealants and caulking materials because they have a unique property profile for applications, such as in building construction. These properties include excellent weatherability, resistance to heat, maintaining their flexibility at low temperatures, ease of application and rapid cure in place. However, the structures on which such sealants and caulking materials are used are often coated with typically organic based decorative and protective coatings, such as paints, varnishes, lacquers and shellacs. Generally silicone elastomers have a disadvantage in that they do not provide surfaces coatable with such organic based decorative and protective coatings.

Many solutions to solving the paintability of cured silicone elastomers have been proposed. However, many of these provide specific room temperature curable (RTV) silicone compositions, containing high levels of organic solvents, which cure to elastomers with paintable surfaces to which at least one type of decorative or protective paint may be applied. These solvent containing compositions are environmentally unacceptable because they have too high a volatile organic content (VOC) due to the high levels of organic solvents present in the uncured composition. Furthermore, high shrinkage caused by the evaporation of the aforementioned organic solvent(s) has a negative effect on the sealing capability of these sealants.

Even today, much of the state of the art teaches that silicone based cured elastomeric bodies are considered to be unpaintable. In U.S. Pat. No. 5,043,012 polishing agents for use in the automobile industry, are described. These contain silicone oils providing water-repellent properties. U.S. Pat. No. 4,902,575, U.S. Pat. No. 4,906,707, U.S. Pat. No. 4,965,311, and U.S. Pat. No. 5,063,270 propose cross-linkable compositions based on modified silicone (MS) polymers that have polymer frameworks built from polyethers such as polyethylene oxide and polypropylene oxide and are said to produce, upon curing, paintable surfaces suitable for painting using alkyd paints.

Several publications propose paintable sealant compositions. These include U.S. Pat. No. 3,817,894, U.S. Pat. No. 4,515,834, U.S. Pat. No. 4,247,445, U.S. Pat. No. 4,358,558 and U.S. Pat. No. 4,985,476. U.S. Pat. No. 4,968,760 proposes one- or two-component compositions, based on branched organosiloxane chains, which, when cured, can be painted or coated. The disadvantage of these systems is the higher cost of producing the branched-chain organosiloxanes as well as the high tensile stresses at 100% elongation of 0.45 to 0.75 $N/mm^2$ (in accordance with DIN 53504), which, for many applications, are disadvantageous as joint sealant.

It has become common practice in the formulation of silicone based compositions used as room temperature cure sealants, to include additives which serve to "extend" and/or "plasticise" the silicone sealant composition by blending the or each extending compound (henceforth referred to as an "extender") and/or plasticising compound (henceforth referred to as a "plasticiser") with the pre-prepared polymer and other ingredients of the composition.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticisers are typically used to also reduce the modulus of the sealant formulation. Plasticisers may reduce the overall unit cost of a sealant but that is not their main intended use and indeed some plasticisers are expensive and could increase the unit cost of a sealant formulation in which they are used. Plasticisers tend to be generally less volatile than extenders and are typically introduced into the polymer composition in the form of liquids or low melting point solids (which become miscible liquids during processing.

Extenders need to be both sufficiently compatible with the remainder of the composition and as non-volatile as possible at the temperature at which the resulting cured elastomeric solid is to be maintained (e.g. room temperature). However it has been found that whilst some proposed extenders are effective during storage, at the time of application of the sealant and at least for a time thereafter, there are several well known problems regarding their use. These include:—
(i) UV stability—the discolouring of cured sealants containing extenders upon prolonged exposure to UV light;
(ii) Poor compatibility with the polymer composition (e.g. a sealant composition) leading to their exuding from the sealant over time which negatively effects the physical and aesthetic properties and lifetime of the cured product e.g. sealant; and
(iii) Staining of the surrounding substrates onto which the extenders exude from the composition.

As previously mentioned the process used in the industry, for introducing extenders and/or plasticisers into a polymer composition such as a sealant composition, consists of merely mixing all the pre-prepared ingredients, e.g. polymer, cross-linker, catalyst, filler and the or each extender together in appropriate amounts and orders of addition. Compatibility of organic extenders and/or plasticisers with the other ingredients in an organopolysiloxane containing polymer composition, is a significantly greater problem than with respect to organic based polymers, silicone polymers into which the extenders and/or plasticisers are introduced tend to be highly viscous polymers, and the chemical nature of the polymer being organopolysiloxane containing as opposed to organic based can have significant effects on compatibility. The level of compatibility effectively determines the amount of extender which can be introduced into a polymer composition. Typically this results in the introduction of significantly lower amounts of, in particular, extenders into the composition than may be desired because the extender will not physically mix into the polymer composition sufficiently well, particularly with the pre-formed polymer which is usually the largest component, other than the filler, in the composition. The problem of compatibility of plasticisers and extenders in silicone polymer compositions has been known in the industry ever since the introduction of organic extenders, which as far the inventors are aware, until the present invention has not been addressed other than by the proposal of an ever increasing number of organic based extenders.

DE3342026 describes a process involving the physical blending of a portion of pre-formed organosilicone polymer together with some or all of the plasticiser. The physical blending of polymer and plasticiser is exemplified in the examples using an alpha omega dihydroxypolydimethylsiloxane having a viscosity of merely about 80000 mPa·s at 20° C. thereby avoiding the problems which the present inventors have addressed and which would be encountered using such a physical blending process for high viscosity polymers wherein such a blending process would involve very expensive mixing equipment for long time periods of time to obtain anything like a suitable blend rendering such a process economically unviable and most likely not provide a suitable blend.

A wide variety of organic compounds and compositions have been proposed for use as extenders for reducing the cost of the silicone sealant compositions. These materials are generally classified into two groups as high volatility extenders and low volatility extenders.

Compositions containing high volatility extenders may contain e.g. toluene or xylene. The high volatility of these compounds causes a number of disadvantages in sealant formulations including, high shrinkage (high volume loss due to evaporation of the solvent), flammability, VOC (volatile organic content), hazardous component labelling, health and safety issues, etc.

Low volatility extenders (sometimes referred to as higher molecular weight extenders), are chosen with the intention of having good compatibility with the polymers in the sealant compositions. These higher molecular weight extenders can completely or partially replace the PDMS plasticizer in the formulation.

Low molecular weight polyisobutylenes (PIB) are proposed as extenders in DE 2364856 and DE 3217516, however, due to the limited compatibility, the maximum amount of PIB extender that can be added to an acetoxy silicone sealant formulation is typically in the 25-30% (by weight) range. A higher addition level causes the extender to bleed to the surface and makes the cured sealant surface sticky. Phosphate esters are described as potential extenders in DE 2802170 and DE 2653499.

Mineral oil fractions (e.g. isoparaffins) and polyalkylbenzenes such as heavy alkylates (alkylated aromatic materials remaining after distillation of oil in a refinery) have also been proposed as extenders. These and other organic compounds and mixtures proposed as extender materials for silicone sealant compositions are described in the following publications:—

GB2041955 describes the use of dodecyl benzene and other alkylarenes as organic extenders. GB2012789 describes the use of trioctyl phosphate for the partial replacement of PDMS. DE3342026 and DE3342027 describe the use of esters of aliphatic monocarboxylic acids as extenders. EP0043501 proposes the use of between 0.2 and 15% by weight of the sealant composition of branched and/or cyclic paraffin hydrocarbons such as cyclohexane, isohexane and isooctodecane. EP0801101 describes the use of a mixture of paraffin oils (molecular weight>180) in combination with one or more alkyl aromatic compounds. EP0842974 describes the use of alkylcyclohexanes (molecular weight>220). WO99/66012 and WO 00/27910 describe oil resistant silicone compositions containing one or more aliphatic liquid polymers and oils, petroleum derived organic oils, alkyl phosphates, polyalkylene glycol, poly (propylene oxides), hydroxyethylated alkyl phenol, dialkyldithiophosphonate, poly (isobutylenes), poly (a-olefins) and mixtures thereof as extenders.

In recent years the industry has increasingly used paraffinic hydrocarbons as extenders. EP0885921 describes the use of paraffinic hydrocarbon mixtures containing 60 to 80% paraffinic and 20 to 40% naphthenic and a maximum of 1% aromatic carbon atoms. EP 0807667 appears to describe a similar extender comprising wholly or partially of a paraffin oil comprising 36-40% cyclic paraffin oils and 58 to 64% non-cyclic paraffin oils. WO99/65979 describes an oil resistant sealant composition comprising a plasticiser which may include paraffinic or naphthenic oils and mixtures thereof amongst other plasticisers. EP1481038 describes the use of a hydrocarbon fluid containing more than 60 wt. % naphthenics, at least 20 wt. % polycyclic naphthenics and an ASTM D-86 boiling point of from 235° C. to 400° C. EP1252252 describes the use of an extender comprising a hydrocarbon fluid having greater than 40 parts by weight cyclic paraffinic hydrocarbons and less than 60 parts by weight monocyclic paraffinic hydrocarbons based on 100 parts by weight of hydrocarbons. EP1368426 describes a sealant composition for use with alkyd paints containing a liquid paraffinic hydrocarbon "extender" which preferably contains greater than 40% by weight of cyclic paraffins.

The inventors have now surprisingly identified a moisture curable composition which once cured to an elastomeric body provides a surface which is paintable with oil based paints.

In accordance with the present invention there is provided a moisture curable composition capable of cure to an elastomeric body comprising
(a) a diluted polymer comprising
  (i) an organosiloxane containing polymer of the formula $X^2$-A-$X^1$ where $X^2$ and $X^1$ are independently selected from silyl groups containing hydroxyl or hydrolysable groups selected from —SiOH$_3$, —(R$^a$)SiOH$_2$, —(R$^a$)$_2$SiOH,
  —R$^a$Si(OR$^b$)$_2$, —Si(OR$^b$)$_3$, —R$^a{}_2$SiOR$^b$ and —R$^a{}_2$Si—R$^c$—SiR$^d{}_p$(OR$^b$)$_{3-p}$ where each R$^a$ independently represents a monovalent hydrocarbyl group, each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2; and A is an organopolysiloxane containing molecular chain; and
  (ii) an organic extender
(b) a suitable cross-linking agent which has at least two hydroxyl and/or hydrolysable groups reactive with the organopolysiloxane polymer, (c) a suitable condensation catalyst
(d) an organic plasticiser selected from one or more of the group of natural drying oils, fatty acid(s), fatty acid esters, polyols, and/or organic phosphates; and optionally
(e) one or more fillers
wherein the organopolysiloxane polymer comprises from 5 to 20% by weight of the composition.

The concept of "comprising" where used herein is used in its widest sense to mean and to encompass the notions of "include" and "consist of". An organosiloxane containing polymer is intended to mean a polymer comprising multiple organopolysiloxane units per molecule and is intended to include a polymer substantially containing only organopolysiloxane groups in the polymer chain or polymers where the backbone contains both organopolysiloxane groups and e.g. organic polymeric groups in the chain. Unless otherwise indicated all viscosity values given are at a temperature of 25° C. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyano-functional groups; sulphur atoms; and sulphur atom containing groups such as mercapto groups.

The diluted polymer comprises a polymer component which in accordance with the present invention is a polysiloxane containing polymer containing at least two hydroxyl or hydrolysable groups, most preferably the polymer comprises terminal hydroxyl or hydrolysable groups. Preferably the polymer has the general formula $$X^2\text{-}A\text{-}X^1 \qquad (1)$$

where $X^2$ and $X^1$ are independently selected from silyl groups substantially all comprising at least one hydroxyl or hydrolysable group and A is a siloxane containing polymeric chain. Examples of groups $X^2$ or $X^1$ include $-SiOH_3$, $-(R^a)SiOH_2$, $-(R^a)_2SiOH$, $-R^aSi(OR^b)_2$, $-Si(OR^b)_3$, $-R^a{}_2SiOR^b$ or $-R^a{}_2Si-R^c-SiR^d{}_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2. Preferably $X^2$ and/or $X^1$ are contain hydroxyl groups or groups which are otherwise hydrolysable in the presence of moisture. In one embodiment a proportion (up to 20%) of $X^2$ groups may be trialkylsilyl groups.

Examples of suitable siloxane containing polymeric chain A in formula (I) are those which comprise a polydiorganosiloxane chain. Thus group A preferably includes siloxane units of formula (2)

$$-(R^5{}_sSiO_{(4-s)/2})- \qquad (2)$$

in which each $R^5$ is independently an organic group such as a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably $R^5$ is a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Polymeric chain A in the compound of formula (1) may include any suitable siloxane or siloxane/organic molecular chain. The resulting polymer may have a viscosity (in the absence of diluents in accordance with the present invention of up to at least 20000000 mPa·s, at 25° C. (i.e. a degree of polymerisation (dp) of up to or even more than 200000 units of formula (2)). In one preferred embodiment polymeric chain A is a linear organopolysiloxane molecular chain (i.e. s=2) for all chain units. Preferred materials have polydiorganosiloxane chains according to the general formula (3)

$$-(R^5{}_2SiO)_t- \qquad (3)$$

in which each $R^5$ is as defined above and is preferably a methyl group and t has a value of up to or even more than 200000. Suitable polymers have viscosities of up to at least 20000000 mPa·s at 25° C. in the absence of the extender(s) but when prepared in the presence of the extender(s) viscosities are generally in the order of 1000 to 100000 mPa·s at 25° C. because of the presence of the extender(s) in the polymer matrix. The polydiorganosiloxanes may be homopolymers or copolymers. Mixtures of different polydiorganosiloxanes having terminal condensable groups are also suitable.

In the case of polydiorganosiloxane co-polymers the polymeric chain may comprise blocks made from chains of units depicted in figure (2) above where the two $R^5$ groups are:—
both alkyl groups (preferably both methyl or ethyl), or
alkyl and phenyl groups, or
alkyl and fluoropropyl, or
alkyl and vinyl or
alkyl and hydrogen groups.
Typically at least one block will comprise siloxane units in which both $R^5$ groups are alkyl groups.

Whilst polymeric chain A is preferably exclusively an organopolysiloxane chain, polymeric chain A may alternatively be a block copolymeric chain comprising at least one block of siloxane groups of the type depicted in formula (2) above and an organic component comprising any suitable organic based polymer backbone for example the organic polymer backbone may comprise, for example, polystyrene and/or substituted polystyrenes such as poly(α-methylstyrene), poly(vinylmethylstyrene), poly(p-trimethylsilylstyrene) and dienes, poly(p-trimethylsilyl-α-methylstyrene). Other organic components which may be incorporated in the polymeric chain A may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides and the like.

However perhaps the most preferred organic based polymeric blocks in A are polyoxyalkylene based blocks. Such polyoxyalkylene blocks preferably comprise a linear predominantly oxyalkylene polymer comprised of recurring oxyalkylene units, $(-C_nH_{2n}-O-)$ illustrated by the average formula $(-C_nH_{2n}-O-)_y$ wherein n is an integer from 2 to 4 inclusive and y is an integer of at least four. The number average molecular weight of each polyoxyalkylene polymer block may range from about 300 to about 10,000. Moreover, the oxyalkylene units are not necessarily identical throughout

the polyoxyalkylene monomer, but can differ from unit to unit. A polyoxyalkylene block, for example, can be comprised of oxyethylene units, (—$C_2H_4$—O—); oxypropylene units (—$C_3H_6$—O—); or oxybutylene units, (—$C_4H_8$—O—); or mixtures thereof.

Other polyoxyalkylene blocks may include, for example, units of the structure—

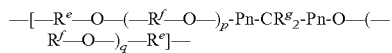

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is, a hydrogen atom or methyl group and each of the subscripts p and q is a positive integer in the range from 3 to 30.

Any suitable extenders or combination of extenders may be utilised as the extender in the diluted polymer. These include each of the following alone or in combination with others from the list:—
polyisobutylenes (PIB),
polyalkylbenzenes,
linear and/or branched alkylbenzenes such as heavy alkylates, dodecyl benzene and other alkylarenes,
linear or branched mono unsaturated hydrocarbons such as linear or branched alkenes or mixtures thereof containing from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise from 5 to 25 carbon atoms per molecule. mineral oil fractions comprising linear (e.g. n-paraffinic) mineral oils, branched (iso-paraffinic) mineral oils, cyclic (referred in some prior art as naphthenic) mineral oils and mixtures thereof. Any suitable compatable mineral oil may be used, examples include linear or branched mono unsaturated hydrocarbons such as linear or branched alkenes or mixtures thereof preferably containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise at least 10, preferably at least 12 and most preferably greater than 20 carbon atoms per molecule.

Preferred extenders in the diluted polymer include the mineral oil fractions, alkylcycloaliphatic compounds and alkybenzenes including polyalkylbenzenes.

Any suitable mixture of mineral oil fractions may be utilised as the extender in the present invention but high molecular weight extenders (e.g. average number molecular weight ($M_n$)>220) are particularly preferred. Examples include:—
alkylcyclohexanes ($M_n$>220);
paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing
(i) 60 to 80% paraffinic and 20 to 40% naphthenic and a maximum of 1% aromatic carbon atoms;
(ii) 30-50%, preferably 35 to 45% naphthenic and 70 to 50% paraffinic and or isoparaffinic oils;
(iii) hydrocarbon fluids containing more than 60 wt. % naphthenics, at least 20 wt. % polycyclic naphthenics and an ASTM D-86 boiling point of greater than 235° C.;
(iv) hydrocarbon fluid having greater than 40 parts by weight naphthenic hydrocarbons and less than 60 parts by weight paraffinic and/or isoparaffinic hydrocarbons based on 100 parts by weight of hydrocarbons.

Preferably the mineral oil based extender or mixture thereof comprises at least one of the following parameters:—
(i) a molecular weight of greater than 150, most preferably greater than 200;
(ii) an initial boiling point equal to or greater than 230° C. (according to ASTM D 86).
(iii) a viscosity density constant value of less than or equal to 0.9; (according to ASTM 2501)
(iv) an average of at least 12 carbon atoms per molecule, most preferably 12 to 30 carbon atoms per molecule;
(v) an aniline point equal to or greater than 70° C., most preferably the aniline point is from 80 to 110° C. (according to ASTM D 611);
(vi) a naphthenic content of from 20 to 70% by weight of the extender and a mineral oil based extender has a paraffinic content of from 30 to 80% by weight of the extender according to ASTM D 3238);
(vii) a pour point of from −50 to 60° C. (according to ASTM D 97);
(viii) a kinematic viscosity of from 1 to 20 cSt at 40° C. (according to ASTM D 445)
(ix) a specific gravity of from 0.7 to 1.1 (according to ASTM D1298);
(x) a refractive index of from 1.1 to 1.8.at 20° C. (according to ASTM D 1218)
(xi) a density at 15° C. of greater than 700 kg/m³ (according to ASTM D4052) and/or
(xii) a flash point of greater than 100° C., more preferably greater than 110° C. (according to ASTM D 93)
(xiii) a saybolt colour of at least +30 (according to ASTM D 156)
(xiv) a water content of less than or equal to 250 ppm (according to ASTM D6304)
(xv) a Sulphur content of less than 2.5 ppm (according to ASTM D 4927)

The alkylbenzene compounds suitable for use include heavy alkylate alkylbenzene or an alkylcycloaliphatic compound. Examples of alkyl substituted aryl compounds useful as extenders and/or plasticisers are compounds which have aryl groups, especially benzene substituted by alkyl and possibly other substituents, and a molecular weight of at least 200. Examples of such extenders as described in U.S. Pat. No. 4,312,801, the content of which is incorporated herein by reference. These compounds can be represented by general formula (V), (VI), (VII) and (VIII)

The alkylbenzene compounds suitable for use include heavy alkylate alkylbenzene or an alkylcycloaliphatic compound. Examples of alkyl substituted aryl compounds useful as extenders and/or plasticisers are compounds which have aryl groups, especially benzene substituted by alkyl and possibly other substituents, and a molecular weight of at least 200. Examples of such extenders as described in U.S. Pat. No. 4,312,801, the content of which is incorporated herein by reference. These compounds can be represented by general formula (I), (II), (III) and (IV)

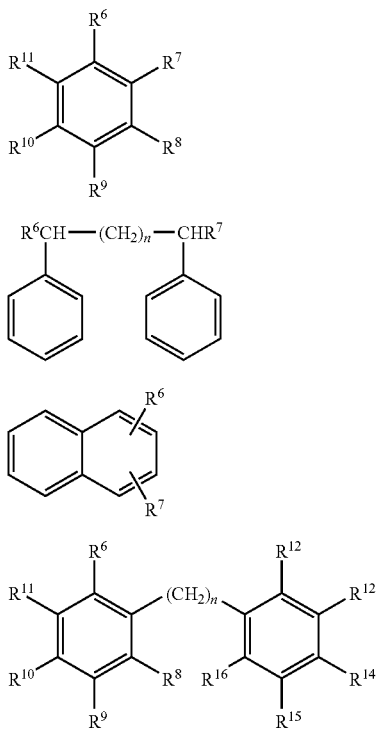

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the extender used in accordance with the process of the present invention is of formula (I) where each of $R^7$, $R^8$, $R^9$, $R^{10}$ and $R^{11}$ is hydrogen and $R^6$ is a $C_{10}$-$C_{13}$ alkyl group. A particularly useful source of such compounds are the so-called "heavy alkylates", which are recoverable from oil refineries after oil distillation. Generally distillation takes place at temperatures in the range of from 230-330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in EP 0842974, the content of which is incorporated herein by reference. Such compounds may be represented by general formula (V).

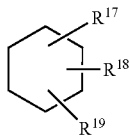

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

Most preferably the extender comprises a mineral oil fraction.

The amount of extender which may be included in the extended polymer composition will depend on for example, the molecular weight of the extender(s) concerned etc. Polymer products in accordance with the present invention may contain from 5% w/w up to 70% w/w extender (based on the combined weight of polymer and extender(s)) depending upon these factors. In general however, the higher the molecular weight of the extender(s), the less will be tolerated in the composition. Typical compositions will contain up to 70% w/w extender(s). More suitable polymer products comprise from 30-60% w/w of a linear extender(s) whereas 25-35% w/w will be more preferred when the extender is a heavy alkylate.

Any suitable cross-linker may be used. The cross-linker used (b) in the moisture curable composition as hereinbefore described is preferably a silane compound containing at least two condensable groups, reactive with the terminal groups of diluted polymer (a). These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

The cross-linker may have two but preferably has three or four silicon-bonded condensable (preferably hydroxyl and/or hydrolysable) groups per molecule which are reactive with the condensable groups in organopolysiloxane polymer (a). When the cross-linker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

The amount of cross-linker present in the composition will depend upon the particular nature of the cross-linker and in particular, the molecular weight of the molecule selected. The compositions suitably contain cross-linker in at least a stoichiometric amount as compared to the polymeric material described above. Compositions may contain, for example, from 2-30% w/w of cross-linker, but generally from 2 to 10% w/w. Acetoxy cross-linkers may typically be present in amounts of from 3 to 8% w/w preferably 4 to 6% w/w whilst oximino cross-linkers, which have generally higher molecular weights will typically comprise from 3-8% w/w.

The composition further comprises a condensation catalyst. The catalyst chosen for inclusion in a particular silicone sealant composition depends upon the speed of cure required. Any suitable condensation catalyst may be utilised to cure the composition including tin, lead, antimony, iron, cadmium, barium, manganese, zinc, chromium, cobalt, nickel, titanium, aluminium, gallium or germanium and zirconium based catalysts such as organic tin metal catalysts and 2-ethylhexoates of iron, cobalt, manganese, lead and zinc may alternatively be used. Organotin, titanate and/or zirconate based catalysts are preferred.

Silicone sealant compositions which contain oximosilanes or acetoxysilanes generally use a tin catalyst for curing, such as triethyltin tartrate, tin octoate, tin oleate, tin naphthate, butyltintri-2-ethylhexoate, tinbutyrate, carbomethoxyphenyl tin trisuberate, isobutyltin triceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate. Dibutyltin dilaurate, dibutyltin diacetate are particularly preferred.

For compositions which include alkoxysilane cross-linker compounds, the preferred curing catalysts are titanate or zirconate compounds. Such titanates may comprise a compound according to the general formula Ti[OR$^{22}$]$_4$ where each R$^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R$^{22}$ include but are not restricted to methyl, ethyl, propyl, isopropyl, butyl, tertiary butyl and a branched secondary alkyl group such as 2,4-dimethyl-3-pentyl. Preferably, when each R$^{22}$ is the same, R$^{22}$ is an isopropyl, branched secondary alkyl group or a tertiary alkyl group, in particular, tertiary butyl.

Examples include tetrabutyltitanate, tetraisopropyltitanate, or chelated titanates or zirconates such as for example diisopropyl bis(acetylacetonyl)titanate, diisopropyl bis(ethylacetoacetonyl)titanate, diisopropoxytitanium Bis(Ethylacetoacetate) and the like. Further examples of suitable catalysts are described in EP1254192 which is incorporated herein by reference. The amount of catalyst used depends on the cure system being used but typically is from 0.01 to 3% by weight of the total composition Alternatively, the titanate may be chelated. The chelation may be with any suitable chelating agent such as an alkyl acetylacetonate such as methyl or ethylacetylacetonate. The catalyst may therefore comprise a mixture or reaction product of $$M(OR)_4 \text{ or} \quad (i)$$

$$M(OR')_x(Z)_z \quad (ii)$$

wherein M is titanium or zirconium, each R' is the same or different and is a primary, secondary or tertiary aliphatic carbon groups or —SiR$^9$$_3$, in which each R$^9$ is an alkyl group having from 1 to 6 carbon atoms;
Z is a group of the formula —O—Y—O— wherein Y is an optionally branched alkylene group comprising from 1 to 8 carbon atoms; and
x is 0 or 2, wherein when x is 0, z is 2 and when x is 2, z is 1; with (iii) a compound having the general formula:

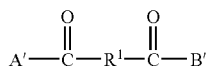

In which
R$^1$ is an optionally substituted alkylene radical having from 1 to 6 carbon atoms,
A' is selected from the group consisting of:
(!) —(CX$_2$)$_n$C(R$^2$)$_3$ wherein n is from 0 to 5,
(!!) an adamantyl group and
(!!!) an adamantyl derivative;
B' is selected from the group consisting of:
a") —(CX$_2$)$_t$C(R$^2$)$_3$, wherein t has a value of from 0 to 5,
b") a monovalent alkyl group having from 1 to 6 carbon atoms, and
c") OR$^3$, wherein R$^3$ is selected from (a") or (b")
each X is the same or different and is a halogen group or hydrogen;
each R$^2$ is the same or different and is X or an alkyl radical having one to eight carbon atoms These materials are produced, for example, by reacting an alcoholate as referred to above with an α- or β-diketone or a derivative thereof. More preferred are those partially chelated titanium compounds having two alcoholate groups attached to titanium. The most preferred organotitanium compounds are those wherein the two alcoholate groups are composed of more than 3 carbon atoms, for example, bis(diethyleneglycoxy)-titanium-(2,4-pentanedionate).

When Z is —O—Y—O— each oxygen atom is bound directly to the titanium atom and x is about 2. Preferably Y is an alkylene group containing 1 to 8 carbon atoms. Examples of the O—Y—O group may include 1,3-dioxypropane (O—(CH$_2$)$_3$—O), 2,4-dimethyl-2,4-dioxypentane (O—C((CH$_3$)$_2$)—CH$_2$—C((CH$_3$)$_2$)—O) and 2,3-dimethyl-2,3-dioxybutane (O—C((CH$_3$)$_2$)—C—((CH$_3$)$_2$)—O)

Regarding now compound (iii), preferably at least one and most preferably each X is a halogen radical. Most preferably the halogen radical is a fluorine radical. Similarly it is preferred that at least one and most preferably each R$^2$ group is a halogen radical and most preferably it is a fluorine radical or each R$^2$ group is an alkyl group, most preferably a methyl or ethyl or butyl group. In a most preferred formulation n is zero. R$^1$ is most preferably a methylene group but can have one alkyl or halogen substituted alkyl group with 1 to 5 carbon atoms. The adamantyl group is a derivative of adamantane or tricyclo-3,3,1,1-decane which is a rigid ring system based on three fused cyclohexane rings.

Examples of compound (iii) include Methyl pivaloylacetate (MPA) and Ethyl 4,4,4-trifluoroacetoacetate (TFA)

Preferably the catalyst, component (d), will be present in an amount of from about 0.1 to 3 weight % of the composition component (d) may be present in a greater amount in cases where chelating agents are used.

The inventors have found that rather than merely any organic plasticiser such as phthalates and the like, component (d) is selected from one or more natural drying oils, fatty acid(s), fatty acid esters such as adipates, azelates, oleates and sebacates, polyols such as ethylene glycol and its derivatives, organic phosphates such as tricresyl phosphate and/or triphenyl phosphates Preferably the suitable organic plasticiser is one or more natural drying oils and/or one or more fatty acid(s) and/or fatty acid ester(s). Preferably at least one (and most preferably each) drying oil, fatty acid and/or fatty acid ester utilised is a liquid at room temperature (about 25° C.). The drying oil may be selected from natural drying oils such as tung oil, linseed oil, vernonia oil and oiticica oil and/or modified natural drying oils such as boiled linseed oil and dehydrated castor oil. Tung oil is particularly preferred. Examples of suitable fatty acids and fatty acid esters for the present invention include stearic acid, oleic acid, alkyl stearates, alkyl oleates, adipates such as disodecyl adipate, glutarates such as diisodecyl glutarate, sorbitan tristearate, ethylene glycol monostearate, glyceryl monostearate, isopropylisostearate and methyloctanoate.

Compositions of this invention may contain, as optional constituents, other ingredients which are conventional to the formulation of silicone rubber sealants and the like. For example, the compositions will normally contain one or more finely divided, reinforcing fillers such as high surface area fumed and precipitated silicas including rice hull ash and to a degree calcium carbonate, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material. For the sake of clarification it should be understood that fatty acids and/or fatty acid esters used for treating fillers are separate from those discussed as an essential additive of the present invention and typically any hydrophobing treatment of the filler will have been done independently of the fatty acid and/or fatty acid esters essential to the present invention.

The proportion of such fillers when employed will depend on the properties desired in the elastomer-forming composition and the cured elastomer. Usually the filler content of the composition will reside within the range from about 5 to about 800 parts by weight preferably 25 to 400 parts by weight per 100 parts by weight of the polymer excluding the extender portion.

Other ingredients which may be included in the compositions include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, electrically and/or heat conductive fillers, Fungicides and/or biocides and the like (which may suitably by present in an amount of from 0 to 0.3% by weight), water scavengers, (typically the same compounds as those used as cross-linkers or silazanes). It will be appreciated that some of the additives are included in more than one list of additives. Such additives would then have the ability to function in all the different ways referred to.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane, reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane, epoxyalkylalkoxy silane, mercaptoalkylalkoxy silane, and derivatives thereof.

Heat stabilizers may include Iron oxides and carbon blacks, Iron carboxylate salts, cerium hydrate, barium zirconate, cerium and zirconium octoates, and porphyrins.

Flame retardants may include for example, carbon black, hydrated aluminium hydroxide, and silicates such as wollastonite, platinum and platinum compounds.

Chain extenders may include difunctional silanes which extend the length of the polysiloxane polymer chains before cross-linking occurs and, thereby, reduce the modulus of elongation of the cured elastomer. Chain extenders and cross-linkers compete in their reactions with the functional polymer ends; in order to achieve noticeable chain extension, the difunctional silane must have substantially higher reactivity than the typical trifunctional cross-linker. Suitable chain extenders for condensation cure systems are, for example, suitable chain extender include for example:—
(i) a Diacetamidosilane, a diacetoxysilane, a dichlorosilane, a diaminosilane where each amino group has one or two N—H bonds per nitrogen; a dialkoxysilane, a diamidosilane, a hexaorganodisilazane, a diketoximinosilane;
(ii) a polydialkylsiloxane having a degree of polymerisation of from 2 to 25 and having at least two acetamido or acetoxy or amino or alkoxy or amido or ketoximo substituents per molecule,
(iii) an α-aminoalkyldialkoxyalkylsilane wherein the alkyl and alkoxy groups contain from 1 to 6 carbon atoms, (iv) a compound of the structure $Z^1Me_2SiO(Me_2SiO)_y$-$SiMe_2Z^1$ or $Z^1Me_2Si$—$Y^1$—$SiMe_2Z^1$ where $Z^1$ is a heterocyclic Si—N group $Y^1$ is a divalent hydrocarbon radical selected from the group consisting of —$(CR^{23}_2)_m$— or —$C_6H_4$—, y is 0 or a whole number, and m is 2 to 6 inclusive and $R^{23}$ is a monovalent hydrocarbon group;

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]} carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]} carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]} carbamate, ethoxyethyl N-{2-[1-(N-propylcarbamoyl)benzimidazolyl]} carbamate, ethoxyethyl N-{2-[1-(N-butylcarbamoyloxy)benzoimidazolyl]}carbamate, methyl N-{2-[1-(N N-dimethylcarbamoyl)-6-chlorobenzimidazolyl]} carbamate, and methyl N-{2-[1-(N,N-dimethylcarbamoyl)-6-nitrobenzimidazolyl]} carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zinc-bis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolylcompounds, such as tebuconazol in combination with zeolites containing silver.

The composition in accordance with the present invention is preferably a one or two part organopolysiloxane sealant composition. A two part composition comprises in the first part extended polymer and filler (when required) and in the second part catalyst and cross-linker are provided for mixing in an appropriate ratio (e.g. from 1:1 to 10:1) immediately prior to use. The optional additives discussed above may be provided in either part 1 or part 2 of the part composition but are preferably added in part two.

The compositions are preferably room temperature vulcanisable compositions in that they cure at room temperature without heating although heating may be used to accelerate cure if appropriate.

A composition in accordance with the present invention may be prepared by mixing the constituents of the composition employing any suitable mixing equipment. Optional constituents may be added as required. For example preferred one part, moisture curable compositions may be made by mixing together the extended polymer having hydroxyl or hydrolysable groups with the plasticizer and/or filler used, and mixing this with a pre-mix of the cross-linker and catalyst. UV-stabilisers, pigments and other additives may be added to the mixture at any desired stage.

After mixing, the compositions may be stored under substantially anhydrous conditions, for example in sealed containers, until required for use.

Compositions according to the invention may be formulated as single part formulations which are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

Thus in a further aspect, the invention provides a method of sealing a space between two units, said method comprising applying a composition as described above and causing or allowing the composition to cure. Suitable units include glazing structures or building units as described above and these form a further aspect of the invention.

The one or two part compositions of the present invention may be formulated as to be stable in storage but cure on exposure to atmospheric moisture (after mixing in the case of two part compositions) and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

The polymerisation in the presence of the diluent gives several advantages with respect to sealant formulations. In respect to rheology, the increase in polymer chain length enabled due to the presence of the diluent compensates for the amount of diluent present in the diluted sealant and as such the viscosity of the diluted polymer is significantly higher than it would be if the diluent had been added to a standard polymer used in sealant formulations currently having for example a viscosity of 80000 to 100000 mPa·s at 25° C. The lower modulus of the resulting sealant additionally means that more movement is possible in the joint being sealed, to the extent that even if diluent loss occurs, the effective modulus caused by the presence of high molecular weight polymers which may be prepared in accordance with the process of the present invention is able to compensate for stress caused to the seal due to shrinkage. The product of the process of the present invention gives superior processing advantages due to the comparatively low viscosity of the diluted polymer when considering the molecular weight of the polymer.

In accordance with the present invention there is provided a moisture curable composition capable of cure to an elastomeric body obtainable by:
(i) polymerising an organopolysiloxane containing monomer or oligomer polymer in the presence of an organic extender via a polycondensation, ring opening, polyaddition or chain extension reaction pathway, optionally in the presence of an end-blocker to form a diluted polymer product;
(a) comprising
(i) an organosiloxane based polymer of the formula $$X^2\text{-}A\text{-}X^1$$

where $X^2$ and $X^1$ are independently selected from silyl groups containing hydroxyl or hydrolysable groups selected from selected from $-SiOH_3$, $-(R^a)SiOH_2$, $-(R^a)_2SiOH$, $-R^aSi(OR^b)_2$, $-Si(OR^b)_3$, $-R^a{}_2SiOR^b$ and $-R^a{}_2Si-R^c-SiR^d{}_p(OR^b)_{3-p}$ where each $R^a$ independently represents a monovalent hydrocarbyl group, each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2; and A is an organopolysiloxane containing molecular chain; and
(ii) mixing the diluted polymer product (a) with
(b) a suitable cross-linking agent which has at least two hydroxyl and/or hydrolysable groups reactive with the organopolysiloxane polymer,
(c) a suitable condensation catalyst
(d) an organic plasticiser selected from one or more of the group of natural drying oils, fatty acid(s), fatty acid esters such as adipates, azelates, oleates and sebacates, polyols such as ethylene glycol and its derivatives, organic phosphates such as tricresyl phosphate and/or triphenyl phosphates and optionally
(e) one or more fillers
wherein the organopolysiloxane polymer comprises from 5 to 20% by weight of the composition.

Preferably the extended polymer in the composition of the present invention is obtainable by any suitable polymerisation process provided the polymer is mixed with the extender during the polymerisation process. Preferred routes to the preparation of said polymer are by the following routes
(i) polycondensation
(ii) ring opening/equilibrium
(iii) polyaddition
(iv) chain extension
wherein where required polymers resulting from the above polymerisation routes may be end-capped to provide the required hydrolysable end-groups.
(i) Polycondensation (i.e. the polymerisation of multiple monomers and/or oligomers with the elimination of low molecular weight by-product(s) such as water, ammonia or methanol etc). Polycondensation type polymerisation reactions are most generally linked to the interaction of compounds having hydroxyl and/or hydrolysable end groups which can interact with the release of e.g. water or methanol or the like. A selection of condensation reactions which may be additionally utilised for the polymerisation process between monomers and/or oligomers in accordance with the present invention include:—
1) the condensation of organohalosilyl groups with an organoalkoxysilyl groups,
2) the condensation of organohalosilyl groups with organoacyloxysilyl groups,
3) the condensation of organohalosilyl groups with organosilanols,
4) the condensation of organohalosilyl groups with silanolates,
5) the condensation of organo-hydrosilyl groups with organosilanol groups
6) the condensation of organoalkoxysilyl groups with organoacyloxysilyl groups
7) the condensation of organoalkoxysilyl groups with organosilanol groups;
8) the condensation of organoaminosilyl groups with organosilanols,
9) the condensation of organoacyloxysilyl groups silanolate groups
10) the condensation of organoacyloxysilyl groups with organosilanols,
11) the condensation of organooximosilyl groups with organosilanol groups
12) the condensation of organoenoxysilyl groups with organosilanols,
13) The condensation of a siloxane compound comprising one or more hydrosilane functional groups with a siloxane compounds containing at least one alkoxysilane functional group, generating hydrocarbon by-products.

Any of the above condensation type reactions may be used for the polymerisation of monomer(s)/oligomer(s) and as such may be the basis for the polymerisation process in accordance with the present invention.

One preferred method for the polymerisation process is the polymerisation of straight chain and/or branched organopolysiloxanes of formula (1a)

$$R'_a SiO_{4-a/2} \tag{1a}$$

wherein each R' is either hydrogen or $R^5$ as hereinbefore described. Preferably the polydiorganosiloxanes are polydialkylsiloxanes, most preferably polydimethylsiloxanes. They are preferably substantially linear materials, which are end-blocked with a siloxane group of the formula $R"_3SiO_{1/2}$, wherein each R" is the same or different and is R' or a condensable group. Any suitable combination of condensable end groups may be used for the polymerisation process of the present invention (i.e. the condensable groups chosen must be able to undergo a condensation reaction together in order to polymerise). Preferably at least one R" group is a hydroxyl or hydrolysable group. Typically the condensable groups used as monomer/oligomer end-groups are as indicated above but may be any groups which will participate in a polycondensation of the monomer/oligomer in the presence of the extender in accordance with the present invention.

Starting materials for the condensation reaction of silanol containing siloxanes are organopolysiloxane oligomers having silicon-bonded hydroxyl groups or hydrolysable groups such as alkoxy groups, which may form silanol groups in situ. Preferably the starting materials have a viscosity of between 10 mPa·s and 5000 mPa·s. Some of the starting materials may comprise non-hydrolysable end-groups.

Many of the above processes require the presence of catalyst. Any suitable polycondensation catalyst may be utilised. These include any of the catalysts described above for the condensation cure of the composition in accordance with the present invention, protic acids, Lewis acids, organic and inorganic bases, metal salts and organometallic complexes. Lewis acid catalysts. (a "Lewis acid" is any substance that will take up an electron pair to form a covalent bond).suitable for the polymerisation in the present invention include, for example, boron trifluoride $FeCl_3$, $AlCl_3$, $ZnCl_2$, and $ZnBr_2$.

More preferred are condensation specific catalysts such as acidic condensation catalysts of the formula $R^{20}SO_3H$ in which $R^{20}$ represents an alkyl group preferably having from 6 to 18 carbon atoms such as for example a hexyl or dodecyl group, an aryl group such as a phenyl group or an alkaryl group such as dinonyl- or didoecyl-naphthyl. Water may optionally be added. Preferably $R^{20}$ is an alkaryl group having an alkyl group having from 6 to 18 carbon atoms such as dodecylbenzenesulphonic acid (DBSA). Other condensation specific catalysts include n-hexylamine, tetramethylguanidine, carboxylates of rubidium or caesium, hydroxides of magnesium, calcium or strontium and other catalysts as are mentioned in the art, e.g. in GB patent specifications 895091, 918823 and EP 0382365. Also preferred are catalysts based on phosphonitrile chloride, for example those prepared according to U.S. Pat. Nos. 3,839,388 and 4,564,693 or EP application 215 470 and phosphonitrile halide ion based catalysts, as described in GB2252975, having the general formula $[X^3(PX^3_2=N)_sPX^3_3]^+[M^2X^3_{(v-t+1)}R^{III}_t]^-$, wherein $X^3$ denotes a halogen atom, $M^2$ is an element having an electronegativity of from 1.0 to 2.0 according to Pauling's scale, $R^{III}$ is an alkyl group having up to 12 carbon atoms, s has a value of from 1 to 6, v is the valence or oxidation state of $M^2$ and t has a value of from 0 to v−1.

Alternatively the catalyst may comprise an oxygen-containing chlorophosphazene containing organosilicon radicals having the following general formula:—

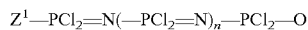

$Z^1$—$PCl_2$=N(—$PCl_2$=N)$_n$—$PCl_2$—O in which
$Z^1$ represents an organosilicon radical bonded to phosphorus via oxygen, a chlorine atom or the hydroxyl group and
n represents 0 or an integer from 1 to 8. The catalyst may also comprise condensation products of the above and/or tautomers thereof (the catalyst exists in a tautomeric form when $Z^1$ is a hydroxyl group).

A further alternative catalyst which might be used as the catalyst in the present invention is any suitable compound providing a source of anions comprising at least one quadri-substituted boron atom and protons capable of interaction with at least one silanol group as defined in WO 01/79330.

The activity of the catalyst is preferably quenched by using a neutralizing agent which reacts with the catalyst to render it non-active. Typically in the case of the acid type condensation catalysts the neutralising agent is a suitable base such as an amine such as a mono/di and trialkanolamines for example monoethanolamine (MEA) and triethanolamine (TEA). In the case of systems using a DBSA catalyst alternative quenching means include aluminasilicate zeolite materials that were found to absorb DBSA and leave a stable polymer. In most cases catalyst residues remain in the polymer product or where appropriate may be removed by filtration or alternative methods. In the case of phosphazene based catalysts when the desired viscosity has been reached, the viscosity of the organosilicon compound obtained in the process can be kept constant by a procedure in which the catalyst used, or a reaction product which has been formed from this catalyst by reaction with organosilicon compound is to be subjected to condensation and/or equilibration and likewise promotes the condensation and/or equilibration of organosilicon compounds, is inhibited or deactivated by addition of inhibitors or deactivators which have been employed to date in connection with phosphazenes, for example, triisononylamine, n-butyl-lithium, lithium siloxanolate, hexamethyldisilazane and magnesium oxide.

Where appropriate any suitable end-blocking agent, which halts the polymerization reaction and thereby limits the average molecular weight, may be used to introduce the silyl end groups described above as $X^2$ and $X^1$.

(ii) Equilibration/Ring Opening

The starting material for equilibration polymerisation processes such as ring-opening polymerisation is a cyclosiloxane (also known as a cyclic siloxane). Cyclic siloxanes which are useful are well known and commercially available materials. They have the general formula $(R^{21}SiO)_m$, wherein each $R^{21}$ is R' is as hereinbefore described and m denotes an integer with a value of from 3 to 12. $R^{21}$ can be substituted, e.g. by halogen such as fluorine or chlorine. The alkyl group can be, for example, methyl, ethyl, n-propyl, trifluoropropyl, n-butyl, sec-butyl, and tert-butyl. The alkenyl group can be, for example, vinyl, allyl, propenyl, and butenyl. The aryl and aralkyl groups can be, for example, phenyl, tolyl, and benzoyl. The preferred groups are methyl, ethyl, phenyl, vinyl, and trifluoropropyl. Preferably at least 80% of all $R^{21}$ groups are methyl or phenyl groups, most preferably methyl. Preferably the average value of m is from 3 to 6. Examples of suitable cyclic siloxanes are octamethylcyclotetrasiloxane, hexamethylcyclotrisiloxane, decamethylcyclopentasiloxane, cyclopenta(methylvinyl)siloxane, cyclotetra(phenylmethyl) siloxane, cyclopentamethylhydrosiloxane and mixtures thereof. One particularly suitable commercially available material is a mixture of comprising octamethylcyclotetrasiloxane and decamethylcyclopentasiloxane. Typically moisture is present in the monomers. The water present acts as an end-blocker by forming OH end groups on the polymers.

Any suitable catalyst may be used. These include alkali metal hydroxides such as lithium hydroxide, sodium hydroxide, potassium hydroxide or caesium hydroxide, alkali metal alkoxides or complexes of alkali metal hydroxides and an alcohol, alkali metal silanolates such as potassium silanolate caesium silanolate, sodium silanolate and lithium silanolate or trimethylpotassium silanolate. Other catalysts which might be utilised include the catalyst derived by the reaction of a tetra-alkyl ammonium hydroxide and a siloxane tetramer and the boron based catalysts as hereinbefore described.

Catalysts which are most preferred for the equilibrium type of reaction however are phosphonitrile halides, phosphazene acids and phosphazene bases as hereinbefore described.

Where required the polymer obtained may be end-blocked as a means of regulating the molecular weight of the polymer and/or to add functionality. Suitable end-blocking agents include silanes having 1 group capable of reacting with the terminal groups of the resulting polymeric constituent prepared in the diluted polymer. Preferred silanes which may be utilised as end-blockers however for the purpose of the present invention. They are used to introduce the hydroxyl and hydrolysable groups depicted above as $X^2$ and $X^1$.

(iii) Polyaddition

For the sake of this specification a "polyaddition" or ("addition polymerisation") process is a polymerisation process whereby unlike in a condensation reaction no by-products such as water or alcohols are generated from the monomeric and oligomeric co-reactants during polymerisation. A preferred addition polymerisation route is a hydrosilylation reaction between an unsaturated organic group e.g. an alkenyl or alkynyl group and an Si—H group in the presence of a suitable catalyst.

Typically the polyaddition route is utilised to form block copolymers by reacting
(a) an organopolysiloxane with:—
(b) (i) one or more organopolysiloxane polymer(s) or
(ii) one or more organic polymer(s)
via an addition reaction pathway in the presence of the extender, and a suitable catalyst and optionally an end-blocking agent; and where required quenching the polymerisation process.

The organopolysiloxane (a) must contain substituents such that it is capable of undergoing an appropriate addition reaction with polymers (b) (i) or (ii). The preferred addition reaction is a hydrosilylation reaction between an unsaturated group and an Si—H group.

Organopolysiloxane monomer (a) is preferably in the form of a straight chain and/or branched organopolysiloxane comprising units of formula (1a)

$$R'_a SiO_{4-a/2} \quad (1a)$$

wherein each R' is as hereinbefore described. Preferably the polydiorganosiloxanes are polydialkylsiloxanes, most preferably polydimethylsiloxanes. When the organopolysiloxane or silane (a) is an Organopolysiloxane monomer, said organopolysiloxane monomer must have at least one group which is reactable with at least two groups, typically the terminal groups, of (b) (i) or (ii) via an addition reaction process. Preferably organopolysiloxane (a) (i) comprises at least one Si—H per molecule, preferably at least two Si—H groups per molecule. Preferably organopolysiloxane (a) (i) is end-blocked with a siloxane group of the formula $H(R")_2SiO_{1/2}$, wherein each R" is a hydrocarbon or substituted hydrocarbon group, most preferably an alkyl group. Preferably organopolysiloxane (a) has a viscosity of between 10 mPa·s and 5000 mPa·s at 25° C.

Organopolysiloxane polymer (b) (i) is preferably a straight chain and/or branched organopolysiloxane comprising units of formula (1b)

$$R'''_a SiO_{4-a/2} \quad (1b)$$

wherein each R''' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2. Preferably no R''' groups may be hydrogen groups. Preferably each R''' is the same or different and are exemplified by, but not limited to alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl.

Organopolysiloxane polymer (b) (i) may comprise any suitable organopolysiloxane polymeric backbone but is preferably linear or branched, and comprises at least one, preferably at least two substituent groups which will react with the aforementioned groups in the organopolysiloxane or silane (a) via an addition reaction pathway. Preferably the or each substituent group of polymer (b) (i) is a terminal group. When the organopolysiloxane or silane (a) comprises at least one Si—H group, the preferred substituent groups on organopolysiloxane polymer (b) (i), which are designed to interact with the Si—H groups, are preferably unsaturated groups (e.g. alkenyl terminated e.g. ethenyl terminated, propenyl terminated, allyl terminated ($CH_2$=$CHCH_2$—)) or terminated with acrylic or alkylacrylic such as $CH_2$=$C(CH_3)$—$CH_2$— groups Representative, non-limiting examples of the alkenyl groups are shown by the following structures; $H_2C$=$CH$—, $H_2C$=$CHCH_2$—, $H_2C$=$C(CH_3)CH_2$—, $H_2C$=$CHCH_2CH_2$—, $H_2C$=$CHCH_2CH_2CH_2$—, and $H_2C$=$CHCH_2CH_2CH_2CH_2$—. Representative, non-limiting examples of alkynyl groups are shown by the following structures; HC≡C—, HC≡CCH_2—, HC≡CC(CH_3)—, HC≡CC(CH_3)_2—, HC≡CC(CH_3)_2CH_2— Alternatively, the unsaturated organic group can be an organofunctional hydrocarbon such as an acrylate, methacrylate and the like such as alkenyl an/or alkynyl groups. Alkenyl groups are particularly preferred.

The organic polymer (b) (ii) may comprise any suitable organic based polymer backbone for example the organic polymer backbone may comprise, for example, polystyrene and/or substituted polystyrenes such as poly(α-methylstyrene), poly(vinylmethylstyrene), poly(p-trimethylsilylstyrene) and poly(p-trimethylsilyl-α-methylstyrene). In each case the monomers used for organic polymer (b) (ii) comprise at least two substituent groups which will react with the reactive groups of the organopolysiloxane or silane (a). Typically the organic polymer (b) (ii) comprises at least two unsaturated terminal groups (preferably selected from the group discussed in the case of b(i) above), preferably alkenyl terminal groups available for interaction with e.g. Si—H groups of the organopolysiloxane or silane (a). Other organic based monomers (b) (ii) may include acetylene terminated oligophenylenes, vinylbenzyl terminated aromatic polysulphones oligomers. Further organic polymeric backbones suitable as (b) (ii) include aromatic polyester based monomers and aromatic polyester based monomers, both preferably comprising alkenyl terminal groups.

Perhaps the most preferred organic based polymeric backbone for use as polymer (b) (ii) are polyoxyalkylene based polymers having unsaturated (e.g. alkenyl) terminal groups. Such polyoxyalkylene polymers (b) (ii) preferably comprise a linear predominantly oxyalkylene polymer comprised of recurring oxyalkylene units, (—$C_nH_{2n}$—O—) illustrated by the average formula (—$C_nH_{2n}$—O—)$_y$, wherein n is an integer from 2 to 4 inclusive and y is an integer of at least four. The number average molecular weight of each polyoxyalkylene polymer (b) may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, (—$C_2H_4$—O—); oxypropylene units (—$C_3H_6$—O—); or oxybutylene units, (—$C_4H_8$—O—); or mixtures thereof.

Other polyoxyalkylene monomers (b) (ii) may include for example:—

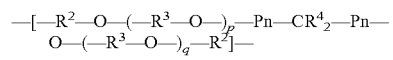

in which Pn is a 1,4-phenylene group, each $R^2$ is, independently from the other, a divalent hydrocarbon group having 2 to 8 carbon atoms, each $R^3$ is, independently from the others, an ethylene group or propylene group, each $R^4$ is, independently from the other, a hydrogen atom or methyl group and each of the subscripts p and q is a positive integer in the range from 3 to 30.

In cases where the organopolysiloxane (a) comprises only one addition reactable group and (b) (i) or (ii) comprises two addition reactable groups which will react with the organopolysiloxane or silane (a), the resulting product will be an "ABA" type polymeric product. Whereas when both the organopolysiloxane (a) comprises two addition reactable group and (b) (i) or (ii) comprises two addition reactable groups which will react with the organopolysiloxane (a) interaction between the two components would lead to (AB)n block copolymers in which the length of the polymer is largely determined by the relative amounts of the two constituents.

Hence linear non-hydrolyzable (AB)n block copolymers in accordance with the present invention of this invention can be prepared by platinum catalyzed hydrosilylation of alkenyl terminated polyethers with SiH-terminated dialkylsiloxane fluids. The resulting copolymer being a combination of polyoxyalkylene blocks linked through silicon to carbon to oxygen linkages (i.e. a propyleneoxy group) and the end-blocking groups being selected from the group consisting of allyl, propenyl and/or hydrogen (dialkyl) siloxy groups (dependent on the relative amounts of the constituents which are present).

When the addition reaction chosen is a hydrosilylation reaction, any suitable hydrosilylation catalyst may be utilised. Such hydrosilylation catalysts are illustrated by any metal-containing catalyst which facilitates the reaction of silicon-bonded hydrogen atoms of the SiH terminated organopolysiloxane with the unsaturated hydrocarbon group on the polyoxyethylene. The metals are illustrated by ruthenium, rhodium, palladium, osmium, iridium, or platinum.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X$, $(R^2_3P)_2Rh(CO)H$, $Rh_2X^4_2Y^2_4$, $H_aRh_b olefin_c Cl_d$, $Rh(O(CO)R^3)_{3-n}(OH)_n$ where $X^4$ is hydrogen, chlorine, bromine or iodine, $Y^2$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^2)(En)_2]_2$, or $(Ir(Z^2)(Dien)]_2$, where $Z^2$ is chlorine, bromine, iodine, or alkoxy, En is an olefin and Dien is cyclooctadiene may also be used.

Additional components can be added to the hydrosilylation reaction which are known to enhance such reactions. These components include salts such as sodium acetate which have a buffering effect in combination with platinum catalysts.

The required amount of this catalyst will depend on the particular catalyst utilized and is not easily predictable. However, for platinum-containing catalysts the amount can be as low as one weight part of platinum for every one million weight parts of components the polyoxyethylene having an unsaturated hydrocarbon group at each molecular terminal and the SiH terminated organopolysiloxane. The catalyst can be added at an amount 10 to 120 weight parts per one million parts of components the polyoxyethylene having an unsaturated organic group at each molecular terminal and the SiH terminated organopolysiloxane, but is typically added in an amount from 10 to 60 weight parts per one million parts of the polyoxyethylene having an unsaturated organic group at each molecular terminal and the SiH terminated organopolysiloxane.

When organopolysiloxane (a) has at least two Si—H groups, typically, the process is carried out using approximately a 1:1 molar ratio of ≡Si—H containing polysiloxane and the material containing unsaturation. It is expected that useful materials may also be prepared by carrying out the process with an excess of either the ≡Si—H containing polysiloxane or the material containing unsaturation, but this would be considered a less efficient use of the materials. Typically, the material containing the unsaturation is used in slight excess to ensure all the SiH is consumed in the reaction.

Where required the polymer obtained may be end-blocked as a means of regulating the molecular weight of the polymer and/or to add functionality. Any suitable end-blockers may be utilised but for the purpose of this invention the end blockers should include one group able to react with the terminal groups of the prepared polymer and the silyl groups herein before described as $X^2$ and $X^1$.

(iv) Chain Extension

In this case rather than adding chain extender into a final pre-prepared polymer composition the extender is mixed into the polymer during a chain extension polymerisation step prior to the introduction of the other constituents of the sealant composition. Typically the polymeric starting material is an organopolysiloxane having end groups suitable for interaction with the chosen chain extending materials. Typically the polymer end groups are either hydrolysable or suitable for addition reaction (typically hydrosilylation) and the chain extending material is chosen on the basis of having suitable reactive groups which will chain extend the polymer. Preferred chain extending materials for chain extending polymers having hydroxyl and/or hydrolysable end groups are as hereinbefore described.

For pre-formed polymers with alkenyl or Si—H end groups suitable for addition reactions via a hydrosilylation route chain extender include for example:—

For pre-formed polymers with alkenyl or Si—H end groups suitable for addition reactions via a hydrosilylation route chain extender include for example:—

A silane comprising two alkenyl groups, a dihydrosilane, a polydialkylsiloxane having a degree of polymerisation of from 2 to 25 and at least one Si-alkenyl bond per terminal group, A polydialkylsiloxane having a degree of polymerisation of from 2 to 25 and at least one Si—H bond per terminal group and wherein each alkyl group independently comprises from 1 to 6 carbon atoms;

organosilicon compounds with the general formula

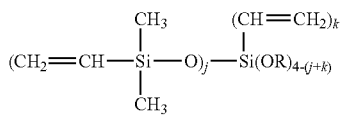

in which R is as hereinbefore described, j is 1, 2, or 3, k is 0 or 1, and j+k is 2 or 3.
exemplified by compounds with the following formulas, (ViMe$_2$SiO)$_2$SiVi(OMe)$_1$ (ViMe$_2$SiO)$_1$SiVi(OMe)$_2$, (ViMe$_2$SiO)$_2$SiVi(OEt)$_1$, (ViMe$_2$SiO)$_1$SiVi(OEt)$_2$, (ViMe$_2$SiO)$_3$Si(OMe)$_1$, (ViMe$_2$SiO)$_2$Si(OMe)$_2$, (ViMe$_2$SiO)$_3$Si(OEt)$_1$ and (ViMe$_2$SiO)$_2$Si(OEt)$_2$
As used herein, Vi represents a vinyl group, Me represents a methyl group, and Et represents an ethyl group.

The catalyst used to catalyse the chain extension reaction is determined by the reaction to take place. When the reaction occurring is a condensation reaction any suitable condensation catalyst as hereinbefore described may be utilised. When the reaction occurring is a hydrosilylation reaction any suitable hydrosilylation catalyst as hereinbefore described may be utilised.

Where required the polymer contains hydrolysable terminal groups, end-blocking agents as described above in relation to condensation may be utilised to obtain appropriate terminal groups. Where required the polymer contains addition reactable terminal groups, end-blocking agents as described above in relation to polyaddition may be utilised to obtain appropriate terminal groups.

The process can be carried out either batchwise or continuously on any suitable mixers. In case of a polycondensation, generated water can either be removed by chemical drying using e.g. hydrolysable silanes like methyltrimethoxysilane or by physical separation using evaporation, coalescing or centrifuging techniques.

Chain extension may take place at any suitable temperature and pressure for the process concerned in batch or continuous modes of operation as preferred. Hence in the case of the phosphazene catalysed methods polymerisation may occur at temperatures of between 50° C. to 200° C., more preferably 80° C. to 160° C. Furthermore, in order to facilitate removal of the by-products formed during the condensation, for example, water, HCl or alcohol, the condensation and/or equilibration of the organosilicon compounds may be carried out at a pressure below 80 kPa. Alternative methods for the removal of condensation by-products include removal by chemical drying using e.g. hydrolysable silanes like methyltrimethoxysilane (where appropriate) or by physical separation using evaporation, coalescing or centrifuging techniques.

The applicants have found that, when cured a sealant made from the composition in accordance with the present invention provide a surface onto which oil based coatings may be applied. The sealant in accordance with the present invention preferably comprises a low concentration (5-20% by weight) of a high molecular weight organopolysiloxane polymer having a viscosity>1000000 mPa·s (in the absence of the extender) and a number average molecular weight ($M_n$) of at least 132000; and degree of polymerisation of at least 1800 measured in accordance with ASTM D5296-05 as polystyrene molecular weight equivalents in combination with the other ingredients including a large proportion of extender which when cured provides a readily coatable (e.g paintable) surface. Such compositions would typically have been practically impossible to make prior to the present invention because of the handling and mixing difficulties encountered with these high molecular weight polymers. Tests suggest that said paintable sealant formulations are comparable if not an improvement over acrylic type fillers and because of their reduction in the amount of silicone present are of comparable price.

It is desirable to, therefore, provide a method suitable for many kinds of RTV silicone elastomeric compositions so that their surfaces are paintable with many kinds of protective coatings and are at the same time more environmentally acceptable.

In accordance with a further aspect of the present invent there is provided a method of producing a cured silicone elastomer with a surface coated with a hardened protective coating comprising, exposing a composition in accordance with the present invention to moisture until a cured elastomeric surface is obtained and a homogeneous dull surface develops, thereafter applying a protective oil-based coating composition hardenable at ambient conditions over at least a portion of the cured elastomeric surface where the protective coating composition wets the surface to which it is applied and produces an essentially flaw-free film and, thereafter, allowing the protective coating composition to harden. As will be seen from the following examples the it was identified that the composition is only suitable for oil-based coatings providing the plasticiser is added to the composition comprising the diluted polymer.

The method of producing a cured silicone elastomer with a surface coated with a hardened protective coating in accordance with this aspect of the present invention provides RTV silicone elastomeric compositions which cure to provide surfaces which can be painted with and organic based paint. This method includes coating the surface of a cured RTV silicone elastomer with a hardenable protective coating, such that it forms a flawless film on the surface of the cured RTV silicone elastomer and hardens. The hardenable protective coatings include any suitable solvent (organic) based protective coating such as varnishes, lacquers, shellacs and solvent (i.e. non-aqueous) such as the alkyd paints.

The invention will now be described by way of Example. For the sake of comparison the extender used in all the examples and comparative examples unless otherwise indicated was HYDROSEAL® G250H, a hydrotreated mineral oil cut (n-para 7% iso-para 51% and naphthenic 42%) produced by Total Fina. All viscosities were measured at 25° C. unless otherwise indicated.

EXAMPLE 1

Preparation of Extended Polymer

The extended polymer was produced in a laboratory batch reactor having a mixing paddle which mixes a mixture at a constant paddle rotation speed (henceforth referred to as "mixing velocity"), in the following example 179 revolutions per minute (RPM) continuously by varying the power in line with the change in viscosity using the following procedure:

0.42 kg of dimethyl hydroxy terminated polydimethylsiloxane (70 mPa·s) and was introduced into the mixer and stirred sequentially adding 21 g of dodecylbenzenesulphonic acid (DBSA) catalyst and 0.56 kg of extender at a constant mixing velocity of 179 RPM. The viscosity of the resulting polymer was tracked by measuring the current (mA) required to maintaining the mixing velocity of 179 RPM. Mixing was continued until the viscosity began to drop at which point the catalyst was neutralised with an amine (e.g. 0.5-1.0% triethanolamine).

It will be appreciated that the starting viscosity is significantly lower when extender is present and remains significantly lower throughout the polymerisation process for the same reason. However, the presence of extender in the starting mixture provides a means of introducing a much higher loading of extender than would previously had been possible under prior processes.

EXAMPLE 2

Comparative

In this example a composition (A1) is compared with four comparative examples (C1-C4) to show the surprising effect using a polymer prepared in the presence of extender to compound a chalk filled alkoxy sealant with reduced silicone content. Table 1 shows the sealant compositions used. It will be noted that composition A1 contains all the components of the present invention apart from organic plasticiser (d).

TABLE 1

| Ingredients | A1 (wt %) | C1 (wt %) | C2 (wt %) | C3 (wt %) | C4 (wt %) |
|---|---|---|---|---|---|
| Dimethylhydroxy terminated polydimethylsiloxane (70 mPa·s) | 14.13 | — | — | — | — |
| Hydroseal ® G250H | 6.15 | — | 13 | 13 | 13 |
| Silanol terminated silicone polymer 50,000 (mPa·s) | — | 31.5 | 31.5 | 31.5 | 31.5 |
| Trimethyl terminated polydimethylsiloxane (Viscosity 100 mPa·s) | — | 13 | — | — | — |
| Dodecylbenzylsulfonic acid | 0.58 | — | — | — | — |
| Monoethanolamine | 0.14 | — | — | — | — |
| CaCO₃ - precipitated - Socal 312 | 38.5 | 28.0 | 28.0 | 26.5 | 26.5 |
| CaCO₃ - ground - Mikart | 33.0 | 24.0 | 24.0 | 23.0 | 23.0 |
| Diisoundecylphthalate | 2.5 | — | — | — | — |
| Oleic Acid | — | — | — | 2.5 | — |
| diisodecyl adipate | — | — | — | — | 2.5 |
| Methyltrimethoxysilane | 3.5 | 2 | 2 | 2 | 2 |
| Diisopropoxytitanium Bis(Ethylacetoacetate) | 1.5 | 1.5 | 1.5 | 1.5 | 1.5 |
| Extended Polymer viscosity (mPa·s) | 20,000 | — | — | — | — |

In Table 1 the comparative formulations (C1-C4) were in the form of a standard chalk filled alkoxy sealant formulations that typically do not contain organic extenders but often contain trimethylsilyl terminated polydimethylsiloxane (PDMS) as a plasticizer.

The polymer utilised in A1 was produced in using the same process as in Example 1 above using the following procedure to obtain 1000 g of polymer:

676 g of dimethylhydroxy terminated polydimethylsiloxane (70 mPa·s) was introduced into the mixer and stirred sequentially adding 28 g of DBSA catalyst and 289 g of extender while maintaining the mixing velocity at 179 RPM. Variation in the viscosity of the resulting polymer was tracked by measuring the current (mA) required to maintain the mixing velocity of 179 RPM. Mixing was continued until the viscosity began to drop at which point the catalyst was neutralized with by the addition of 6.7 g of monoethanolamine.

The resulting extended polymer had a viscosity of 20000 mPa·s and was then blended with the other ingredients in the amounts indicated in Table 1 to form the A1 sealant composition. C1 to C4 were blended using a traditional unextended polymer to make the compositions indicated in Table 1.

The resulting compounded sealants were then allowed to cure for a week at 23° C. and 50% relative humidity prior to analysis of their cure properties and mechanical properties (Table 2).

TABLE 2

| Standards properties | Methods | A1 | C1 | C2 | C3 | C4 |
|---|---|---|---|---|---|---|
| Tack Free Time (min) | ASTM D2377-94 | 14 | 35 | 14 | 11 | 15 |
| Cure in Depth 24 hr (mm/24 hr) | | 1.2 | 2 | 2.2 | — | — |
| Tensile Strength (MPa) | ASTM D412-98a | 0.4 | 1.88 | 1.66 | 0.60 | 1.11 |
| Elongation at break (%) | ASTM D412-98a | 275 | 690 | 622 | 764 | 602 |
| 100% modulus (MPa) | ASTM D638-97 | 0.41 | 0.45 | 0.59 | 0.10 | 0.33 |
| Hardness (Shore A) | ASTM D2240-97 | 40 | 30 | 27 | 5 | 15 |
| Adhesion on glass (1) | | 2 (pass) | 2 (pass) | | | |
| Adhesion on glass (2) | | 2 (pass) | 2 (pass) | | | |

The cure in depth tests were undertaken to determine how far below the surface the sealant had hardened in 24 hours by filling a suitable container (avoiding the introduction of air pockets) with sealant, curing the sealant contained in the container for the appropriate period of time at room temperature (about 23° C.) and about 50% relative humidity. After the appropriate curing time the sample is removed from the container and the height of the cured sample is measured.

Adhesion test (1) was carried out to show that a bead of sealant successfully bonded to a standard glass plate after being allowed to cure at 23° C. and 50% relative humidity for 7 days. Adhesion was assessed by subsequent to the curing period the beads were pulled at 90° and the failure was rated as follows:
0: adhesive failure—poor adhesion)
1: boundary or mixed mode (adhesive/cohesive) failure—acceptable adhesion.
2: cohesive failure—excellent adhesion Adhesion test (2) was carried out to show that a bead of sealant successfully bonded to a standard glass plate after being allowed to cure at 23° C. and 50% relative humidity for 7 days and then subsequently 7 days in water. The bead of sealant was pulled as in adhesion test (1).

The sealants prepared and cured were also analysed for paintability and the results are provided in Table 3 using the standard crosshatch test to assess the integrity, i.e. the adhesion, of the paint to the sealant surface. Prior to testing a crosshatch was prepared using a scalpel on the painted cured sealant surface. This provides the viewer with a grid of preferably 100 small sections. The adhesive tape, ASTM 03359 was applied to different samples or different areas of the same sample. The tape was then removed to determine which, if any paint was poorly adhered to the sealant surface. This was achieved by studying the adhesive on the tape to determine whether or not any paint had been transferred to the adhesive from the substrate surface. In the above test the lacquer was coated onto a sample of cured sealant (previously allowed to cure for 24 hours) and then was allowed to dry at room temperature for a period of 24 hours. It was determined that in the case of the C1-C4 formulations as will be seen in Table 3 the paint did not properly disperse on the surface of the sealant.

TABLE 3

| Paint | A1 | C1 | C2 | C3 | C4 |
|---|---|---|---|---|---|
| LEVIS ® - Colors of the world water based - 5309 Bali green | 0% | No Disp. | No Disp. | No Disp. | No Disp. |
| LEVIS ® - enviroment wall water based - 9550 mauve | 0% | 100% | 94% | No Disp. | No Disp. |
| DE KEYN ® - interior/exterior enamel water based - 699 red | 0% | No Disp. | No Disp. | No Disp. | No Disp. |
| EXCELLENCE ® (Briko depot) - plastic painting water based - vert spring | 0% | No Disp. | 50% | No Disp. | 100% |
| BRIKOBI ® - brilliant acrylic enamel water based - B51 sky blue | 0% | No Disp. | No Disp. | No Disp. | No Disp. |
| LEVIS - satin enamel solvent based - 5834 empire green | 97% | 48% | 100% | 100% | 100% |
| LEVIS - ferro decorations solvent based - 4659 canary yellow | 100% | 0% | 100% | 100% | 100% |
| DULUX - Urban Edition (enamel) solvent based - satin skyline | 100% | 99% | 100% | 100% | 100% |
| SIGMA (COLOR) - high brilliance enamel solvent based - white | 100% | 100% | 89% | 100% | 100% |
| HERBOL - Herbolux satin solvent based - Silky white | 100% | 100% | 100% | 100% | 100% |

As will be seen from Table 3 the inventors obtained surprising results in that whilst comparative compositions C1-C4 gave poor paintability results for both water-based and solvent-based paints composition A1 gave good results for water based paints but equally poor paintability results for solvent based paints.

EXAMPLE 3

After extensive research the inventors identified that the addition of a suitable plasticiser, component (C), rather than merely any organic plasticiser was required. This is exemplified in the following Tables where the properties of the sealant composition identified as A2 is compared for paintability properties with assorted solvent-based paints. As can be seen from Table 4, A2 is a sealant composition substantially the same as composition A1 above but additionally containing 2.5% by weight of diisoundecylphthalate. Composition A2 gave poor paintability results for solvent based paints (Table 5) when compared with compositions Ex1 and Ex2 which are compositions in accordance with the present invention and which provide a suitable paintable surface for solvent based paints.

TABLE 4

| Ingredients | A2 (wt %) | Ex1 (wt %) | Ex2 (wt %) | Ex3 (wt %) |
|---|---|---|---|---|
| Dimethylhydroxy terminated polydimethylsiloxane (70 mPa · s) | 14.23 | 14.23 | 14.23 | 14.13 |
| Hydroseal G250H | 6.05 | 6.05 | 6.05 | 6.05 |
| Dodecylbenzylsulfonic acid | 0.58 | 0.58 | 0.58 | 0.58 |
| Monoethanolamine | 0.14 | 0.14 | 0.14 | 0.14 |
| $CaCO_3$ - precipitated - Socal 312 | 38.5 | 38.5 | 38.5 | 38.85 |
| $CaCO_3$ - ground - Mikart | 33.0 | 33 | 33 | 34.5 |
| Diisoundecylphthalate | 2.5 | — | — | — |
| Oleic acid | — | 2.5 | — | — |
| Diisodecyl adipate | — | — | 2.5 | — |
| Tung Oil | — | — | — | 0.75 |
| Methyltrimethoxysilane | 3.5 | 3.5 | 3.5 | 3.5 |
| Diisopropoxytitanium Bis(Ethylacetoacetate) | 1.5 | 1.5 | 1.5 | 1.5 |
| Polymer viscosity (mPa · s) | 20,000 | 20,000 | 20,000 | 20,000 |

Sealants in accordance with the compositions detailed in Table 4 were prepared in a similar fashion to that described in Example 2 above and the resulting compounded sealants were then allowed to cure for a week at 23° C. and 50% relative humidity prior to analysis of their cure properties and mechanical properties by the same methods as described above. The results are provided in Table 5 below.

TABLE 5

| Standards properties | Units | A2 | Ex1 | Ex2 | Ex3 |
|---|---|---|---|---|---|
| Tack Free Time | 16 (min) | 14 | 16 | 15 | 7 |
| Cure in Depth 24 hr | (mm/24 h) | 1.2 | 2.3 | 1 | 1.07 |
| Tensile (sheet 2 mm) | (Mpa) | 0.4 | 0.50 | 0.56 | 0.60 |
| Elongation at break | (%) | 275 | 509 | 291 | 599 |
| 100% modulus | (Mpa) | 0.41 | 0.32 | 0.44 | 0.46 |
| Hardness | (Shore A) | 40 | 33 | 34 | 36 |

TABLE 5-continued

| Paint adhesion loss | | | | |
|---|---|---|---|---|
| LEVISLUX - super brilliant enamel solvent based - 6845 royal blue | 0% | 4% | 0% | 0% |
| LEVIS - ferro decorations solvent based - 4659 canary yellow | 100% | 5% | 45% | 1% |
| DULUX - Uban Edition (Enamel) solvent based - satin skyline | 100% | 0% | 11% | 0% |
| SIGMA (COLOR) - high brilliance enamel solvent based - white | 100% | 0% | 0% | 0% |
| HERBOL - Herbolux satin solvent based - Silky white | 100% | 0% | 0% | 0% |

The inventors found that whilst sealant surfaces cured from compositions in accordance to the present invention could be painted after only a short period of time (e.g. 1 hour) optimum results were attained when the sealant was allowed to cure at room temperature for at least one day.

The invention claimed is:

1. A moisture curable composition capable of cure to an elastomeric body comprising
  (a) an extended polymer comprising
    (i) an organosiloxane containing polymer of the formula $X^2$-A-$X^1$ where $X^2$ and $X^1$ are independently selected from silyl groups containing hydroxyl or hydrolysable groups selected from $-Si(OH)_3$, $-(R^a)Si(OH)_2$, $-(R^a)_2SiOH$, $-R^aSi(OR^b)_2$, $-Si(OR^b)_3$, $-R^a{}_2SiOR^b$ and $-R^a{}_2Si-R^c-SiR^d{}_p(OR^b)_{3-p}$ where each $R^a$ independently represents a monovalent hydrocarbyl group, each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to 6 silicon atoms; and p has the value 0, 1 or 2; and A is an organopolysiloxane containing molecular chain; and
    (ii) an organic extender selected from linear or branched mono unsaturated hydrocarbons,
  (b) a suitable cross-linking agent which has at least two hydroxyl and/or hydrolysable groups reactive with the organopolysiloxane polymer,
  (c) a suitable condensation catalyst,
  (d) an organic plasticiser selected from one or more of the group of natural drying oils, fatty acid(s), fatty acid esters, polyols, and organic phosphates, and optionally
  (e) one or more fillers
  wherein the organopolysiloxane polymer comprises from 5 to 20% by weight of the composition.

2. A composition in accordance with claim 1 wherein the cross-linking agent is one or more silane or siloxane which contain acyloxy groups and/or ketoximino groups, and the catalyst is a tin catalyst.

3. A composition in accordance with claim 1 wherein the cross-linking agent is one or more silane or siloxane which contain alkoxy groups and/or alkenyloxy groups and the catalyst is a titanate or zirconate or a chelated titanate or chelated zirconate.

4. A composition in accordance with claim 1 wherein the filler is present and comprises one or more finely divided, reinforcing fillers selected from the group of fumed silica, precipitated silica and calcium carbonate, and/or one or more non-reinforcing fillers selected from the group of crushed quartz, diatomaceous earth, barium sulphate, iron oxide, titanium dioxide, carbon black, talc and wollastonite.

5. A composition in accordance with claim 1 wherein the plasticiser is a liquid at room temperature.

6. A composition in accordance with claim 1 wherein the plasticiser comprises a drying oil selected from tung oil, linseed oil, vernonia oil, oiticica oil, boiled linseed oil, and dehydrated castor oil.

7. A composition in accordance with claim 1 wherein the plasticiser comprises one or more of stearic acid, oleic acid, alkyl stearates, alkyl oleates, adipates, glutarates, sorbitan tristearate, ethylene glycol monostearate, glyceryl monostearate, isopropylisostearate and methyloctanoate.

8. A composition in accordance with claim 1 wherein the extended polymer is formed by a method comprising the steps of:
  (i) preparing an organopolysiloxane polymer having condensable end groups by polymerising a cyclic, linear and/or branched organopolysiloxane in the presence of a silicone based and/or organic based extender, a suitable catalyst and optionally an end-blocking agent; and
  (ii) where required quenching the polymerisation process.

9. A paintable elastomeric body formed by curing a composition in accordance with claim 1.

10. An elastomeric body in accordance with claim 9 having a surface with an at least partial coating of solvent based paint.

11. An elastomeric body in accordance with claim 10 wherein the elastomeric body is a joint sealant, an adhesive, a moulded body, a coating or a formed-in-place gasket.

12. A method of sealing a space between two units, said method comprising applying a composition in accordance with claim 1 and causing or allowing the composition to cure.

13. A method of producing a cured silicone elastomer with a surface coated with a hardened protective coating comprising, exposing a composition in accordance with claim 1 to moisture until a cured elastomeric surface is obtained and a homogeneous dull surface develops, thereafter applying a protective coating composition, hardenable at ambient conditions, over at least a portion of the cured elastomeric surface where the protective coating composition wets the surface to which it is applied and produces an essentially flaw-free film and, thereafter, allowing the protective coating composition to harden.

14. A multi-pack sealant composition according to claim 1 comprising a first pack comprising polymer (a) and optionally filler (e) and a second pack comprising catalyst (d) and cross-linker (b) and wherein optional additives are in either or both said first and second packs.

15. A composition in accordance with claim 1 wherein the extender further comprises one or more linear or branched alkenes or mixtures thereof containing from 12 to 25 carbon atoms.

16. A composition in accordance with claim 1 wherein the cross-linking agent is one or more silane or siloxane which contain alkoxy groups and alkenyloxy groups and the catalyst is a titanate or zirconate or a chelated titanate or chelated zirconate.

17. A composition in accordance with claim 1 wherein the plasticiser is the fatty acid ester and the fatty acid ester is selected from the group of adipates, azelates, oleates and sebacates.

18. A composition in accordance with claim 1 wherein the plasticiser is the polyol and the polyol is selected from the group of ethylene glycol and its derivatives.

19. A composition in accordance with claim 1 wherein the plasticiser is the organic phosphate and the organic phosphate is selected from the group of tricresyl phosphate and triphenyl phosphates.

20. A moisture curable composition capable of cure to an elastomeric body comprising
(a) an extended polymer comprising
(i) an organosiloxane containing polymer of the formula
$X^2$-A-$X^1$ where $X^2$ and $X^1$ are independently selected from silyl groups containing hydroxyl or hydrolysable groups selected from $-Si(OH)_3$, $-(R^a)Si(OH)_2$, $-(R^a)_2SiOH$, $-R^aSi(OR^b)_2$, $-Si(OR^b)_3$, $-R^a{}_2SiOR^b$ and $-R^a{}_2Si-R^c-SiR^d{}_p(OR^b)_{3-p}$ where each $R^a$ independently represents a monovalent hydrocarbyl group, each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to 6 silicon atoms; and p has the value 0, 1 or 2; and A is an organopolysiloxane containing molecular chain; and
(ii) an organic extender selected from one or more of the group comprising linear or branched alkenes or mixtures thereof containing from 12 to 25 carbon atoms,
(b) a suitable cross-linking agent which has at least two hydroxyl and/or hydrolysable groups reactive with the organopolysiloxane polymer,
(c) a suitable condensation catalyst,
(d) an organic plasticiser selected from one or more of the group of natural drying oils, fatty acid(s), fatty acid esters, polyols, and organic phosphates, and optionally
(e) one or more fillers
wherein the organopolysiloxane polymer comprises from 5 to 20% by weight of the composition.

21. A method of producing a cured silicone elastomer with a surface coated with a hardened protective coating comprising, exposing a moisture curable composition to moisture until a cured elastomeric surface is obtained and a homogeneous dull surface develops, the moisture curable composition comprising
(a) an extended polymer comprising
(i) an organosiloxane containing polymer of the formula
$X^2$-A-$X^1$ where $X^2$ and $X^1$ are independently selected from silyl groups containing hydroxyl or hydrolysable groups selected from $-Si(OH)_3$, $-(R^a)Si(OH)_2$, $-(R^a)_2SiOH$, $-R^aSi(OR^b)_2$, $-Si(OR^b)_3$, $-R^a{}_2SiOR^b$ and $-R^a{}_2Si-R^c-SiR^d{}_p(OR^b)_{3-p}$ where each $R^a$ independently represents a monovalent hydrocarbyl group, each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to 6 silicon atoms; and p has the value 0, 1 or 2;
and A is an organopolysiloxane containing molecular chain; and
(ii) an organic extender selected from one or more of the group comprising polyisobutylenes (PIB), linear and/or branched alkylbenzenes, linear or branched mono unsaturated hydrocarbons, and mineral oil fractions comprising linear (n-paraffinic) mineral oils, branched (iso-paraffinic) mineral oils, cyclic (naphthenic) mineral oils, and mixtures thereof,
(b) a suitable cross-linking agent which has at least two hydroxyl and/or hydrolysable groups reactive with the organopolysiloxane polymer,
(c) a suitable condensation catalyst,
(d) an organic plasticiser selected from one or more of the group of natural drying oils, fatty acid(s), fatty acid esters, polyols, and organic phosphates, and optionally
(e) one or more fillers
wherein the organopolysiloxane polymer comprises from 5 to 20% by weight of the composition,
thereafter applying a protective coating composition, hardenable at ambient conditions, over at least a portion of the cured elastomeric surface where the protective coating composition wets the surface to which it is applied and produces an essentially flaw-free film and, thereafter, allowing the protective coating composition to harden.

* * * * *